(12) United States Patent
Gally et al.

(10) Patent No.: US 7,898,521 B2
(45) Date of Patent: *Mar. 1, 2011

(54) DEVICE AND METHOD FOR WAVELENGTH FILTERING

(75) Inventors: Brian J. Gally, Los Gatos, CA (US); William J. Cummings, Millbrae, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 951 days.

This patent is subject to a terminal disclaimer.

(21) Appl. No.: 11/213,659

(22) Filed: Aug. 26, 2005

(65) Prior Publication Data

US 2006/0067633 A1 Mar. 30, 2006

Related U.S. Application Data

(60) Provisional application No. 60/613,403, filed on Sep. 27, 2004.

(51) Int. Cl.
*G09G 3/34* (2006.01)

(52) U.S. Cl. .................................................. 345/108

(58) Field of Classification Search ............ 345/84, 345/85, 108; 385/129–132; 359/247, 254, 359/259, 260, 261, 263, 577, 578
See application file for complete search history.

(56) References Cited

U.S. PATENT DOCUMENTS

| | | |
|---|---|---|
| 2,534,846 A | 12/1950 | Ambrose et al. |
| 2,677,714 A | 5/1954 | Max |
| 3,247,392 A | 4/1966 | Thelen |
| 3,443,854 A | 5/1969 | Weiss |
| 3,448,334 A | 6/1969 | Frost |
| 3,653,741 A | 4/1972 | Marks |
| 3,679,313 A | 7/1972 | Rosenberg |
| 3,725,868 A | 4/1973 | Malmer, Jr., et al. |
| 3,955,190 A | 5/1976 | Teraishi |
| 4,099,854 A | 7/1978 | Decker et al. |
| 4,200,472 A | 4/1980 | Chappell |
| 4,377,324 A | 3/1983 | Durand et al. |
| 4,389,096 A | 6/1983 | Hori et al. |

(Continued)

FOREIGN PATENT DOCUMENTS

CN 1517743 8/2004

(Continued)

OTHER PUBLICATIONS

International Search Report for PCT US2005 / 032633 dated Jan. 28, 2006.

(Continued)

*Primary Examiner* — Quan-Zhen Wang
*Assistant Examiner* — Tom V Sheng
(74) *Attorney, Agent, or Firm* — Knobbe, Martens, Olson & Bear, LLP

(57) ABSTRACT

Embodiments include devices and methods for wavelength filtering. For example, one embodiment includes a display comprising a plurality of the display elements each comprising a movable reflector, a first partial reflector, and a second partial reflector. The first partial reflector is positioned at a first distance from the movable reflector and forms a first optical resonant cavity therebetween. The second partial reflector is positioned at a second distance from said first partial reflector and forming a second optical resonant cavity therebetween. In various embodiments, the movable reflector is movable with respect to the first partial reflector to alter the first optical cavity. Other embodiments include a method of making devices.

55 Claims, 9 Drawing Sheets

U.S. PATENT DOCUMENTS

| | | | |
|---|---|---|---|
| 4,400,577 A | 8/1983 | Spear | |
| 4,421,381 A | 12/1983 | Ueda et al. | |
| 4,441,789 A | 4/1984 | Pohlack | |
| 4,441,791 A | 4/1984 | Hornbeck | |
| 4,633,031 A | 12/1986 | Todorof | |
| 4,790,635 A | 12/1988 | Apsley | |
| 4,859,060 A | 8/1989 | Katagiri et al. | |
| 4,980,775 A | 12/1990 | Brody | |
| 4,982,184 A | 1/1991 | Kirkwood | |
| 5,022,745 A | 6/1991 | Zahowski et al. | |
| 5,044,736 A | 9/1991 | Jaskie et al. | |
| 5,142,414 A | 8/1992 | Koehler | |
| 5,164,858 A | 11/1992 | Aguilera, Jr. et al. | |
| 5,192,946 A | 3/1993 | Thompson et al. | |
| 5,231,532 A | 7/1993 | Magel et al. | |
| 5,233,385 A | 8/1993 | Sampsell | |
| 5,287,215 A | 2/1994 | Warde et al. | |
| 5,293,272 A | 3/1994 | Jannson et al. | |
| 5,311,360 A | 5/1994 | Bloom et al. | |
| 5,345,322 A | 9/1994 | Fergason et al. | |
| 5,356,488 A | 10/1994 | Hezel | |
| 5,365,283 A | 11/1994 | Doherty et al. | |
| 5,398,170 A | 3/1995 | Lee | |
| 5,401,983 A | 3/1995 | Jokerst | |
| 5,448,314 A | 9/1995 | Heimbuch et al. | |
| 5,457,900 A | 10/1995 | Roy | |
| 5,517,347 A | 5/1996 | Sampsell | |
| 5,550,373 A | 8/1996 | Cole et al. | |
| 5,619,059 A | 4/1997 | Li et al. | |
| 5,619,365 A | 4/1997 | Rhoades et al. | |
| 5,619,366 A | 4/1997 | Rhoads et al. | |
| 5,633,739 A | 5/1997 | Matsuyama | |
| 5,647,036 A | 7/1997 | Deacon | |
| 5,654,819 A | 8/1997 | Goossen | |
| 5,710,656 A | 1/1998 | Goossen | |
| 5,739,945 A | 4/1998 | Tayebati | |
| 5,745,281 A | 4/1998 | Yi et al. | |
| 5,754,260 A | 5/1998 | Ooi | |
| 5,771,321 A | 6/1998 | Stern | |
| 5,805,117 A | 9/1998 | Mazurek | |
| 5,815,229 A | 9/1998 | Shapiro et al. | |
| 5,825,528 A | 10/1998 | Goosen | |
| 5,835,255 A | 11/1998 | Miles | |
| 5,853,310 A * | 12/1998 | Nishimura et al. | 445/24 |
| 5,868,480 A | 2/1999 | Zeinali | |
| 5,886,688 A | 3/1999 | Fifield | |
| 5,892,598 A | 4/1999 | Asakawa et al. | |
| 5,914,804 A | 6/1999 | Goosen et al. | |
| 5,933,183 A | 8/1999 | Enomoto | |
| 5,959,763 A | 9/1999 | Bozler et al. | |
| 5,986,796 A | 11/1999 | Miles et al. | |
| 5,991,073 A | 11/1999 | Woodgate et al. | |
| 6,028,690 A | 2/2000 | Carter et al. | |
| 6,031,653 A | 2/2000 | Wang et al. | |
| 6,040,937 A | 3/2000 | Miles | |
| 6,046,840 A | 4/2000 | Huibers | |
| 6,055,090 A | 4/2000 | Miles | |
| 6,056,406 A | 5/2000 | Park et al. | |
| 6,088,102 A | 7/2000 | Manhart | |
| 6,113,239 A | 9/2000 | Sampsell et al. | |
| 6,195,196 B1 | 2/2001 | Kimura et al. | |
| 6,201,633 B1 | 3/2001 | Peeters et al. | |
| 6,243,149 B1 | 6/2001 | Swanson et al. | |
| 6,282,010 B1 | 8/2001 | Sulzbach | |
| 6,285,424 B1 | 9/2001 | Yoshida | |
| 6,288,824 B1 | 9/2001 | Kastalsky | |
| 6,300,558 B1 | 10/2001 | Takamoto | |
| 6,301,000 B1 | 10/2001 | Johnson | |
| 6,323,834 B1 | 11/2001 | Colgan | |
| 6,342,970 B1 | 1/2002 | Sperger et al. | |
| 6,356,378 B1 | 3/2002 | Huibers | |
| 6,381,022 B1 | 4/2002 | Zavracky et al. | |
| 6,400,738 B1 * | 6/2002 | Tucker et al. | 372/20 |
| 6,466,358 B2 | 10/2002 | Tew | |
| 6,483,613 B1 | 11/2002 | Woodgate et al. | |
| 6,522,794 B1 | 2/2003 | Bischel | |
| 6,538,748 B1 | 3/2003 | Tucker | |
| 6,549,338 B1 | 4/2003 | Wolverton et al. | |
| 6,574,033 B1 | 6/2003 | Chui | |
| 6,597,419 B1 | 7/2003 | Okada et al. | |
| 6,597,490 B2 | 7/2003 | Tayebati | |
| 6,636,322 B1 | 10/2003 | Terashita | |
| 6,643,069 B2 | 11/2003 | Dewald | |
| 6,650,455 B2 | 11/2003 | Miles | |
| 6,674,562 B1 | 1/2004 | Miles | |
| 6,680,792 B2 | 1/2004 | Miles | |
| 6,738,194 B1 | 5/2004 | Ramirez et al. | |
| 6,741,377 B2 | 5/2004 | Miles | |
| 6,768,555 B2 | 7/2004 | Chen et al. | |
| 6,773,126 B1 | 8/2004 | Hatjasalo et al. | |
| 6,798,469 B2 | 9/2004 | Kimura | |
| 6,811,267 B1 | 11/2004 | Allen et al. | |
| 6,822,780 B1 | 11/2004 | Long | |
| 6,822,798 B2 | 11/2004 | Wu | |
| 6,841,787 B2 | 1/2005 | Almogy | |
| 6,867,896 B2 | 3/2005 | Miles | |
| 6,870,581 B2 | 3/2005 | Li et al. | |
| 6,880,959 B2 | 4/2005 | Houston | |
| 6,882,458 B2 | 4/2005 | Lin et al. | |
| 6,912,022 B2 | 6/2005 | Lin et al. | |
| 6,930,816 B2 | 8/2005 | Mochizuki | |
| 6,967,779 B2 | 11/2005 | Fadel et al. | |
| 6,972,889 B2 | 12/2005 | Goodwin-Johansson | |
| 6,982,820 B2 | 1/2006 | Tsai | |
| 6,995,890 B2 | 2/2006 | Lin et al. | |
| 6,999,225 B2 | 2/2006 | Lin et al. | |
| 6,999,236 B2 | 2/2006 | Lin et al. | |
| 7,002,726 B2 | 2/2006 | Patel | |
| 7,006,272 B2 | 2/2006 | Tsai | |
| 7,009,754 B2 | 3/2006 | Huibers | |
| 7,016,095 B2 | 3/2006 | Lin | |
| 7,034,981 B2 | 4/2006 | Makigaki | |
| 7,038,752 B2 | 5/2006 | Lin | |
| 7,042,643 B2 | 5/2006 | Miles | |
| 7,072,093 B2 | 7/2006 | Piehl et al. | |
| 7,072,096 B2 | 7/2006 | Holman et al. | |
| 7,110,158 B2 | 9/2006 | Miles | |
| 7,113,339 B2 | 9/2006 | Taguchi et al. | |
| 7,123,216 B1 | 10/2006 | Miles | |
| 7,126,738 B2 | 10/2006 | Miles | |
| 7,138,984 B1 | 11/2006 | Miles | |
| 7,142,347 B2 | 11/2006 | Islam | |
| 7,161,728 B2 | 1/2007 | Sampsell et al. | |
| 7,161,730 B2 | 1/2007 | Floyd | |
| 7,172,915 B2 | 2/2007 | Lin et al. | |
| 7,187,489 B2 | 3/2007 | Miles | |
| 7,218,429 B2 | 5/2007 | Batchko | |
| 7,304,784 B2 * | 12/2007 | Chui et al. | 359/290 |
| 7,342,705 B2 | 3/2008 | Chui et al. | |
| 7,342,709 B2 | 3/2008 | Lin | |
| 7,372,449 B2 | 5/2008 | Kodama et al. | |
| 7,372,613 B2 | 5/2008 | Chui et al. | |
| 7,385,748 B2 | 6/2008 | Miles | |
| 7,463,421 B2 | 12/2008 | Miles | |
| 7,605,969 B2 | 10/2009 | Miles | |
| 7,701,029 B2 | 4/2010 | Mabuchi | |
| 7,710,632 B2 | 5/2010 | Cummings | |
| 7,719,500 B2 | 5/2010 | Chui | |
| 7,750,886 B2 | 7/2010 | Sampsell | |
| 2001/0049061 A1 | 12/2001 | Nakagaki et al. | |
| 2001/0055208 A1 | 12/2001 | Kimura | |
| 2002/0015215 A1 | 2/2002 | Miles | |
| 2002/0024711 A1 | 2/2002 | Miles | |
| 2002/0054424 A1 | 5/2002 | Miles | |
| 2002/0075555 A1 | 6/2002 | Miles | |
| 2002/0080465 A1 | 6/2002 | Han | |
| 2002/0126364 A1 | 9/2002 | Miles | |
| 2002/0154215 A1 | 10/2002 | Schechterman | |
| 2002/0167730 A1 | 11/2002 | Needham et al. | |
| 2003/0006730 A1 | 1/2003 | Tachibana | |
| 2003/0011864 A1 | 1/2003 | Flanders | |
| 2003/0043157 A1 | 3/2003 | Miles | |
| 2003/0107692 A1 | 6/2003 | Sekiguchi | |
| 2003/0151821 A1 | 8/2003 | Favalora | |
| 2003/0160919 A1 | 8/2003 | Suzuki et al. | |
| 2003/0161040 A1 | 8/2003 | Ishii | |
| 2003/0169385 A1 | 9/2003 | Okuwaki | |

| | | | | | | |
|---|---|---|---|---|---|---|
| 2003/0179383 | A1 | 9/2003 | Chen et al. | EP | 0 786 911 | 7/1997 |
| 2003/0206281 | A1 | 11/2003 | Jain | EP | 0 822 441 | 2/1998 |
| 2003/0210363 | A1 | 11/2003 | Yasukawa et al. | EP | 0 830 032 | 3/1998 |
| 2003/0213514 | A1 | 11/2003 | Ortabasi | EP | 0 855 745 | 7/1998 |
| 2003/0214621 | A1 | 11/2003 | Kim et al. | EP | 1 003 062 | 5/2000 |
| 2004/0008438 | A1 | 1/2004 | Sato | EP | 1 014 161 | 6/2000 |
| 2004/0027315 | A1 | 2/2004 | Senda et al. | EP | 1 205 782 | 5/2002 |
| 2004/0027671 | A1 | 2/2004 | Wu et al. | EP | 1 251 454 | 10/2002 |
| 2004/0027701 | A1 | 2/2004 | Ishikawa | EP | 1 336 876 | 8/2003 |
| 2004/0051929 | A1 | 3/2004 | Sampsell et al. | EP | 1 341 025 | 9/2003 |
| 2004/0066477 | A1 | 4/2004 | Morimoto et al. | EP | 1 389 775 | 2/2004 |
| 2004/0070711 | A1 | 4/2004 | Wen et al. | EP | 1 413 543 | 4/2004 |
| 2004/0080938 | A1 | 4/2004 | Holman et al. | EP | 1 640 313 | 3/2006 |
| 2004/0115339 | A1 | 6/2004 | Ito | EP | 1 640 767 | 3/2006 |
| 2004/0125048 | A1 | 7/2004 | Fukuda et al. | EP | 1 640 779 | 3/2006 |
| 2004/0125281 | A1 | 7/2004 | Lin et al. | EP | 1 670 065 A | 6/2006 |
| 2004/0174583 | A1 | 9/2004 | Chen et al. | EP | 2 030 947 | 3/2009 |
| 2004/0188599 | A1 | 9/2004 | Viktorovitch et al. | EP | 2 051 124 A | 4/2009 |
| 2004/0217919 | A1 | 11/2004 | Piehl et al. | EP | 2 058 863 A2 | 5/2009 |
| 2004/0218251 | A1 | 11/2004 | Piehl et al. | GB | 2 278 222 | 11/1994 |
| 2005/0024557 | A1 | 2/2005 | Lin | GB | 2321532 | 7/1998 |
| 2005/0035699 | A1 | 2/2005 | Tsai | JP | 02-068513 | 3/1990 |
| 2005/0036095 | A1 | 2/2005 | Yeh et al. | JP | 02-151079 A | 6/1990 |
| 2005/0042117 | A1 | 2/2005 | Lin | JP | 04-081816 | 3/1992 |
| 2005/0046919 | A1 | 3/2005 | Taguchi | JP | 04-238321 A | 8/1992 |
| 2005/0057442 | A1 | 3/2005 | Way | JP | 08 018990 A | 1/1996 |
| 2005/0069209 | A1 | 3/2005 | Damera-Venkata et al. | JP | 09 189869 | 7/1997 |
| 2005/0117623 | A1 | 6/2005 | Shchukin et al. | JP | 09-189910 | 7/1997 |
| 2005/0195462 | A1 | 9/2005 | Lin | JP | 09 281917 | 10/1997 |
| 2005/0212738 | A1 | 9/2005 | Gally | JP | 09-281917 A | 10/1997 |
| 2005/0253820 | A1 | 11/2005 | Horiuchi | JP | 10 500224 | 1/1998 |
| 2006/0022966 | A1 | 2/2006 | Mar | JP | 11 002712 | 1/1999 |
| 2006/0028708 | A1 | 2/2006 | Miles | JP | 11 174234 | 7/1999 |
| 2006/0066541 | A1 | 3/2006 | Gally | JP | 11-174234 A | 7/1999 |
| 2006/0066557 | A1 | 3/2006 | Floyd | JP | 11-211999 | 8/1999 |
| 2006/0066641 | A1 | 3/2006 | Gally | JP | 11 211999 | 8/1999 |
| 2006/0066935 | A1 | 3/2006 | Cummings et al. | JP | 11-295726 A | 10/1999 |
| 2006/0067600 | A1 | 3/2006 | Gally | JP | 2000-500245 | 1/2000 |
| 2006/0067651 | A1 | 3/2006 | Chui | JP | 2000 500245 | 1/2000 |
| 2006/0077122 | A1 | 4/2006 | Gally | JP | 2000 514568 | 10/2000 |
| 2006/0077124 | A1 | 4/2006 | Gally | JP | 2001-343514 A | 12/2001 |
| 2006/0077127 | A1 | 4/2006 | Sampsell | JP | 2001-345458 | 12/2001 |
| 2006/0077149 | A1 | 4/2006 | Gally | JP | 2002 062505 | 2/2002 |
| 2006/0077153 | A1 | 4/2006 | Cummings | JP | 2002-062505 | 2/2002 |
| 2006/0077512 | A1 | 4/2006 | Cummings | JP | 2002-174780 | 6/2002 |
| 2006/0091824 | A1 | 5/2006 | Pate | JP | 2002-229023 | 8/2002 |
| 2006/0103912 | A1 | 5/2006 | Katoh | JP | 2002 287047 | 10/2002 |
| 2006/0130889 | A1 | 6/2006 | Li et al. | JP | 2002-287047 | 10/2002 |
| 2006/0180886 | A1 | 8/2006 | Tsang | JP | 2003-021821 A | 1/2003 |
| 2006/0201546 | A1 | 9/2006 | Yokoyama | JP | 2003-195201 | 7/2003 |
| 2006/0262279 | A1 | 11/2006 | Miles | JP | 2003-315732 | 11/2003 |
| 2006/0274243 | A1 | 12/2006 | Iijima et al. | JP | 2003 315732 | 11/2003 |
| 2006/0274400 | A1 | 12/2006 | Miles | JP | 2004-012642 | 1/2004 |
| 2006/0286381 | A1 | 12/2006 | Naito | JP | 2004-111278 | 4/2004 |
| 2007/0132843 | A1 | 6/2007 | Miles | JP | 2004-212673 | 7/2004 |
| 2007/0196040 | A1 | 8/2007 | Wang | JP | 2004-212922 | 7/2004 |
| 2007/0206267 | A1 | 9/2007 | Tung | JP | 2004-206049 | 10/2004 |
| 2007/0247704 | A1 | 10/2007 | Mignard | JP | 2005-308871 | 11/2005 |
| 2007/0253054 | A1 | 11/2007 | Miles | KR | 2002/010322 A | 2/2002 |
| 2008/0055706 | A1 | 3/2008 | Chui et al. | KR | 2003-0081662 A | 10/2003 |
| 2008/0112031 | A1 | 5/2008 | Gally | TW | ROC 594155 | 6/2004 |
| 2008/0112039 | A1 | 5/2008 | Chui | WO | WO 95/30924 | 11/1995 |
| 2008/0151347 | A1 | 6/2008 | Chui | WO | WO 96/08833 | 3/1996 |
| 2009/0059346 | A1 | 3/2009 | Xu | WO | WO 97/17628 | 5/1997 |
| 2009/0073540 | A1 | 3/2009 | Kothari | WO | WO 97/44707 A | 11/1997 |
| 2009/0086301 | A1 | 4/2009 | Gally | WO | WO 99/67680 | 12/1999 |
| 2009/0101192 | A1 | 4/2009 | Kothari | WO | WO 01/81994 | 11/2001 |
| 2009/0151771 | A1 | 6/2009 | Kothari | WO | WO 02/24570 | 3/2002 |
| 2009/0242024 | A1 | 10/2009 | Kothari | WO | WO 02/071132 A2 | 9/2002 |
| 2009/0293955 | A1 | 12/2009 | Kothari et al. | WO | WO 03/007049 | 1/2003 |
| 2010/0096006 | A1 | 4/2010 | Griffiths | WO | WO 03/056876 | 7/2003 |
| 2010/0096011 | A1 | 4/2010 | Griffiths | WO | WO 03/073151 | 9/2003 |
| FOREIGN PATENT DOCUMENTS | | | | WO | WO 2004/006003 | 1/2004 |
| DE | | 196 22 748 | 12/1997 | WO | WO 2004/068460 | 8/2004 |
| DE | | 103 29 917 A1 | 2/2005 | WO | WO 2005/076051 | 8/2005 |
| EP | | 0 223 136 A | 5/1987 | WO | WO 2006/036519 | 4/2006 |
| EP | | 0 667 548 | 8/1995 | WO | WO 2006/036524 | 4/2006 |
| EP | | 0 695 959 | 2/1996 | | | |

| | | |
|---|---|---|
| WO | WO 2006/036540 | 4/2006 |
| WO | WO 2007/127046 | 11/2007 |
| WO | WO 2009/032525 | 3/2009 |

OTHER PUBLICATIONS

Miles, MW "A MEMS Based Interferometric Modulator (IMOD) for Display Applications" Proceedings of Sensors Expo, Oct. 21, 1997 © 1997 Helmer's Publishing, Inc. (1997-20-21), pp. 281-284 XP009058455.
Official Communication in EP 05800920.0 dated May 21, 2008.
International Search Report and Written Opinion in PCT/US2005/032335(International Publication No. WO 2006/036519) dated Dec. 30, 2005.
Office Action in U.S. Appl. No. 11/208,085, filed Dec. 10, 2008.
International Preliminary Report and Written Opinion in PCT/US2005/032633(International Publication No. WO 2006/036540) dated Mar. 27, 2007.
Magel, "Integrated Optic Devices Using Micromachined Metal Membranes", SPIE vol. 2686, 0-8194-2060-Mar. 1996.
Manzardo. et. al., "Optics and Actuators for Miniaturized Spectrometers," International Conf. on Optical MEMS, vol. 12, Issue 6, p. 23-24, Dec. 2003.
Mehregany et al., "MEMS Applications in Optical Systems", IEEE/LEOS 1996 Summer Topical Meetings, pp. 75-76, (Aug. 5-9, 1996).
Miles, Interferometric Modulation: MOEMS as an enabling technology for high-performance reflective displays, Proceedings of the SPIE, 4985:28, pp. 131-139, Jan. 2003.
Miles, Mark, W., "A New Reflective FPD Technology Using Interferometric Modulation", The Proceedings of the Society for Information Display (May 11-16, 1997).
Petschick, et.al., "Fabry-Perot-Interferometer", May 14, 2002, available at http://pl.physik.tu-berlin.de/groups/pg279/protokolless02/04_fpi.pdf.
Raley et al., "A Fabry-Perot Microinterferometer for Visible Wavelengths," IEEE Solid-State Sensor and Actuator Workshop, Hilton Head, SC, pp. 170-173 (1992).
Sperger et al., "High Performance Patterned All-Dielectric Interference Colour Filter for Display Applications", SID Digest, pp. 81-83, (1994).
Walker, et al., "Electron-beam-tunable Interference Filter Spatial Light Modulator", Optics Letters vol. 13, No. 5, pp. 345-347, (May 1988).
Wu, "Design of a Reflective Color LCD Using Optical Interference Reflectors", Asia Display '95, pp. 929-930, (Oct. 1995).
Austrian Search Report in U.S. Appl. No. 11/083,84, filed Jul. 14, 2005.
Austrian Search Report in U.S. Appl. No. 11/036,965, filed Jul. 25, 2005.
Austrian Search Report in U.S. Appl. No. 11/051,258, filed May 13, 2005.
Austrian Search Report in U.S. Appl. No. 11/077,974, filed Jul. 14, 2005.
Extended European Search Report in App. No. 05255657.8 (Publication No. EP 1640767) dated Dec. 7, 2005.
Extended European Search Report in App. No. 05255714.7; Publication No. EP 1 640 779) dated Apr. 14, 2009.
Extended Search Report in European Application No. 05255646.1; Publication No. EP 1 640 313) dated Feb. 6, 2007.
Aratani et al., "Process and Design Considerations for Surface Micromachined Beams for a Tuneable Interferometer Array in Silicon," Proc. IEEE Microelectromechanical Workshop, Fort Lauderdale, FL, pp. 230-235 (Feb. 1993).
Aratani K. et. al.,"Surface Micromachined Tuneable Interferometer Array," Sensors and Actuators A, vol. A43, No. 1/3, pp. 17-23, May 1994.
Conner, "Hybrid Color Display Using Optical Interference Filter Array," SID Digest, pp. 577-580 (1993).
Fan et al., "Channel Drop Filters in Photonic Crystals", Optics Express, vol. 3, No. 1, 1998.
Giles et al., "Silicon Mems Optical Switch Attenuator and Its Use in Lightwave Subsystems", IEEE Journal of Selected Topics in Quanum Electronics, vol. 5. No. 1, Jan./Feb., 1999,pp. 18-25.

Goossen et al., "Silicon Modulator Based on Mechanically-Active Anti-Reflection Layer with 1Mbit/sec Capability for Fiber-in-the-Loop Applications," IEEE Photonics Technology Letters, pp. 1119, 1121 (Sep. 1994).
Hohlfeld et. al., "Micro-machined tunable optical filters with optimized band-pass spectrum," 12th International Conference on Transducers, Solid-State Sensors, Actuators and Microsystems, vol. 2, pp. 1494-1497, Jun. 2003.
Huang, et al., "Multidirectional Asymmetrical Microlens-Array Light Control Films for High Performance Reflective Liquid Crystal Displays", SID Digest, 2002, pp. 870-873.
Jerman et al., "A Miniature Fabry-Perot Interferometer Fabricated Using Silicon Micromaching Techniques," IEEE Electron Devices Society (1998).
Jerman et al., "A Miniature Fabry-Perot Interferometer with a Corrugated Silicon Diaphragm Support", (1988).
Little et al., "Vertically Coupled Microring Rosonator Channel Dropping Filter", IEEE Photonics Technology Letters, vol. 11, No. 2, 1999.
International Search Report and Written Opinion in PCT/US2005/032426; (International Publication No. WO 2006/036524) dated Jan. 11, 2006.
International Search Report and Written Opinion in PCT/US2007/008790; (International Publication No. WO 2007/1270460 dated Nov. 2, 2007.
ISR and WO dated Jun. 8, 2005 in International Patent Application No. PCT/US2005/002986; International Publication No. WO 2005/076051).
International Search Report and Written Opinion in PCT/US2005/032886; (International Publication No. WO 2006/036564) dated Mar. 30, 2006.
Baumeister, et al., "Glass, Polarizing, Interference Filters", American Institute Physics Handbook, pp. 6-170-6-182 (3rd. ed. 1972).
Amendment in U.S. Appl. No. 11/208,085 dated Jun. 8, 2009.
Notice of Allowance in U.S. Appl. No. 11/208,085 dated Sep. 14, 2009.
RCE and IDS in U.S. Appl. No. 11/208,085 mailed on Nov. 13, 2009.
Preliminary Amendment in U.S. Appl. No. 11/208,085 mailed on Dec. 14, 2009.
Notice of Allowance in U.S. Appl. No. 11/208,085 mailed on Dec. 29, 2009.
Office Action dated Dec. 30, 2009 in U.S. Appl. No. 11/937,437.
Office Action dated Mar. 14, 2008 in Chinese App. No. 2005800310558.
Office Action dated Feb. 27, 2009 in Chinese App. No. 2005800310558.
Official Communication dated Oct. 31, 2007 in European App. No. 05798393.4.
Official Communication dated Jun. 12, 2009 in European App. No. 05798393.4.
Examination Report dated Jun. 12, 2009 in Singapore App. No. 200701863-3.
Notice of Reasons for Rejection in Japanese App. No. 2007-533476, dated Oct. 6, 2009.
Official Communication in Mexican App. No. MX/a/2007/003602, mailed Jun. 17, 2009.
ISR and WO PCT/US05/029822 dated Dec. 28, 2005.
IPRP for PCT/US05/029822 dated Apr. 5, 2007.
Extended European Search Report in App. No. 08153441.4 (Publication No. EP 2030947) dated Mar. 25, 2009.
International Search Report and Written Opinion in PCT/US2008/073610 (International Pub. No. WO 2009/032525) dated Apr. 6, 2009.
Official Communication in European Application No. 05800920.0 mailed Dec. 4, 2009.
Minutes of Oral Proceedings in European App. No. 05 800 920.1 dated May 20, 2010.
International Preliminary Report on Patentability and Written Opinion in PCT/US2008/073610 (International Pub. No. WO 2009/032525) dated Nov. 30, 2009.
Result of Consultation in European Application No. 05800920, dated Feb. 23, 2010.

Notice of Intention to Grant in European Application No. 05800920, dated Jun. 2, 2010.
Office Action in U.S. Appl. No. 11/187,129, dated May 4, 2007.
Amendment in U.S. Appl. No. 11/187,129, dated Jul. 3, 2007.
Notice of Allowance in U.S. Appl. No. 11/187,129, dated Jul. 18, 2007.
Response to Office Action in U.S. Appl. No. 11/937,437, dated Mar. 29, 2010.
Notice of Allowance in U.S. Appl. No. 11/937,437, dated Jun. 29, 2010.
Official Communication in European Application No. 05798393, dated Jun. 8, 2010.
Notice of Reasons for Rejection in Japanese Application No. 2007-533476, dated Feb. 16, 2010.
Notice of Reasons for Rejection in Japanese Application No. 2007-433476, dated Jun. 8, 2010.
Substantive Examination Report in Application No. PI 20054182, dated Jan. 15, 2010.
Office Action in Application No. 2007110165/28, dated Nov. 23, 2009.
Amendment After Notice of Allowance in U.S. Appl. No. 11/208,085, dated Mar. 26, 2010.
Response to Rule 312 Communication in U.S. Appl. No. 11/208,085, dated Apr. 15, 2010.
Request for Continued Examination (RCE), Amendment, and Petition to Withdraw from Issue in U.S. Appl. No. 11/208,085, dated May 25, 2010.
Decision Grating Petition to Withdraw from Issue in U.S. Appl. No. 11/208,085, dated May 27, 2010.
Notice of Allowance in U.S. Appl. No. 11/208,085, dated Jul. 6, 2010.
International Preliminary Report on Patentability in PCT/US2005/032335 (International Publication No. WO 2006/036519) dated Apr. 5, 2007.
Official Communication in Japanese Application No. 2007-533524, dated Jun. 8, 2010.
Nakagawa et al., "Wide-Field -of-View Narrow-Band Spectral Filters Based on Photonic Crystal Nanocavities", Optical Society of America, Optics Letters, vol. 27, No. 3, pp. 191-193, 2002.
Notice of Allowance in U.S. Appl. No. 11/208,085, dated Oct. 29, 2010.

* cited by examiner

|  | Column Output Signals | |
|---|---|---|
|  | + $V_{bias}$ | - $V_{bias}$ |
| Row Output Signals   0 | Stable | Stable |
| + ΔV | Relaxed | Actuate |
| −ΔV | Actuate | Relaxed |

DEVICE AND METHOD FOR WAVELENGTH FILTERING

RELATED APPLICATIONS

This application claims the benefit of, and incorporates by reference, U.S. Provisional Application No. 60/613,403 filed Sep. 27, 2004.

FIELD

The field of the invention relates to microelectromechanical systems (MEMS).

BACKGROUND

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Preferred Embodiments" one will understand how the features of this invention provide advantages over other display devices.

One embodiment includes a device for modulating light. The device includes a movable reflector. The device further includes a first partial reflector positioned at a first distance from the movable reflector. The device further includes a second partial reflector positioned at a second fixed distance from the first partial reflector. The movable reflector is movable with respect to the first partial reflector to alter the first distance.

Another embodiment includes a device comprising a plurality of display elements. Each of the display elements includes a movable reflector. Each of the display elements further includes a first partial reflector positioned at a first distance from the movable reflector and forming a first optical resonant cavity therebetween. Each of the display elements further includes a second partial reflector positioned at a second distance from the first partial reflector and forming a second optical resonant cavity therebetween. The movable reflector is movable with respect to the first partial reflector to alter the first optical cavity.

Another embodiment includes a device comprising a plurality of display elements. Each of the display elements includes means for reflecting light. The reflecting means is movable. Each of the display elements further includes first means for partially reflecting light. The reflecting means and the first partially reflecting means are configured to interferometrically modulate light. Each of the display elements further includes second means for partially reflecting light. The first partially reflecting means and the second partially reflecting means are configured to interferometrically modulator light.

Another embodiment includes method of making a device for modulating light. The method includes forming a movable reflector. The method further includes forming a first partial reflector positioned at a first distance from the movable reflector. The method further includes forming a second partial reflector positioned at a second fixed distance from the first partial reflector. The movable reflector is movable with respect to the first partial reflector to alter the first distance.

Another embodiment includes a device for modulating light. The device includes a movable reflector. The device further includes a first partial reflector positioned at a first distance from the movable reflector. The movable reflector is movable with respect to the partial reflector to alter the first distance. The device further includes at least one layer of dielectric material between the first partial reflector and the movable reflector. The device further includes a second partial reflector positioned at a second fixed distance from the first partial reflector. The device further includes an electrode positioned between the first and second partial reflectors and configured to alter the position of the movable mirror.

DETAILED DESCRIPTION OF PREFERRED EMBODIMENTS

The following detailed description is directed to certain specific embodiments of the invention. Various of these embodiments comprise interferometric modulator displays which include a fixed interferometric wavelength filter or color filter. In particular, one embodiment includes a display element comprising a movable reflector positioned at a distance from a first partial reflector to define a first optical cavity that forms an interferometric modulator. A second partial reflector is positioned at a distance from the first partial reflector to define a second optical cavity. The first and second partial reflectors define a wavelength filter that produces a spectral response different from that of the interferometric modulator alone. The structure so defined provides additional control over the spectral response of the device while adding only a few additional layers to the display. Moreover, unlike, for example, some absorptive filters, the additional layers may be formed of the same materials as the other layers of the interferometric modulator so as to further reduce manufacturing complexity.

However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Figure 1:
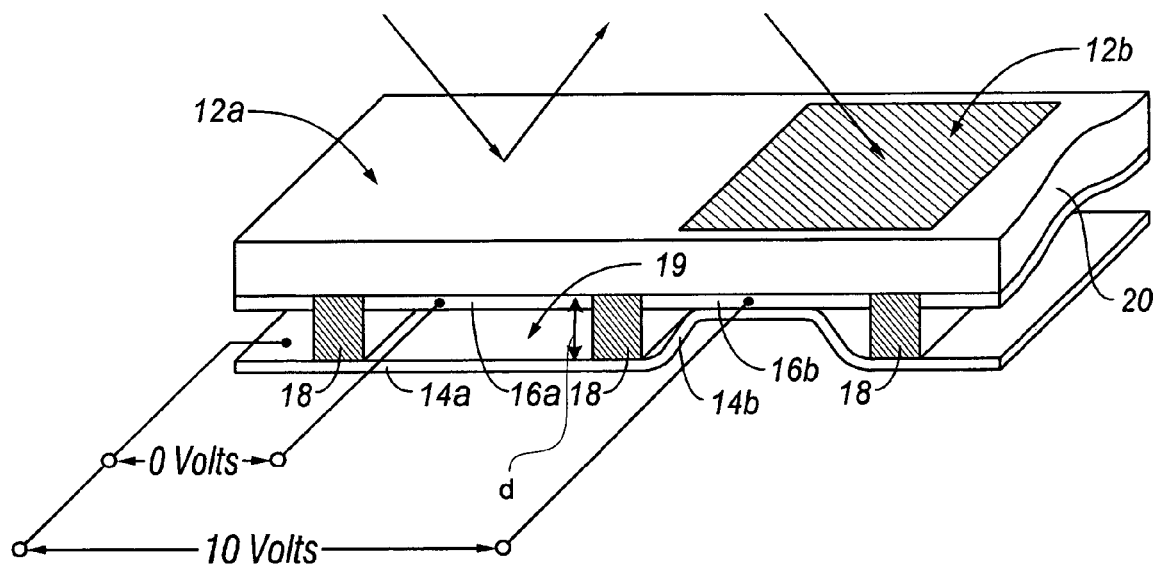
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise of several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. In some embodiments, the layers are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the cavity 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5 illustrate one exemplary process and system for using an array of interferometric modulators in a display application.

Figure 2:
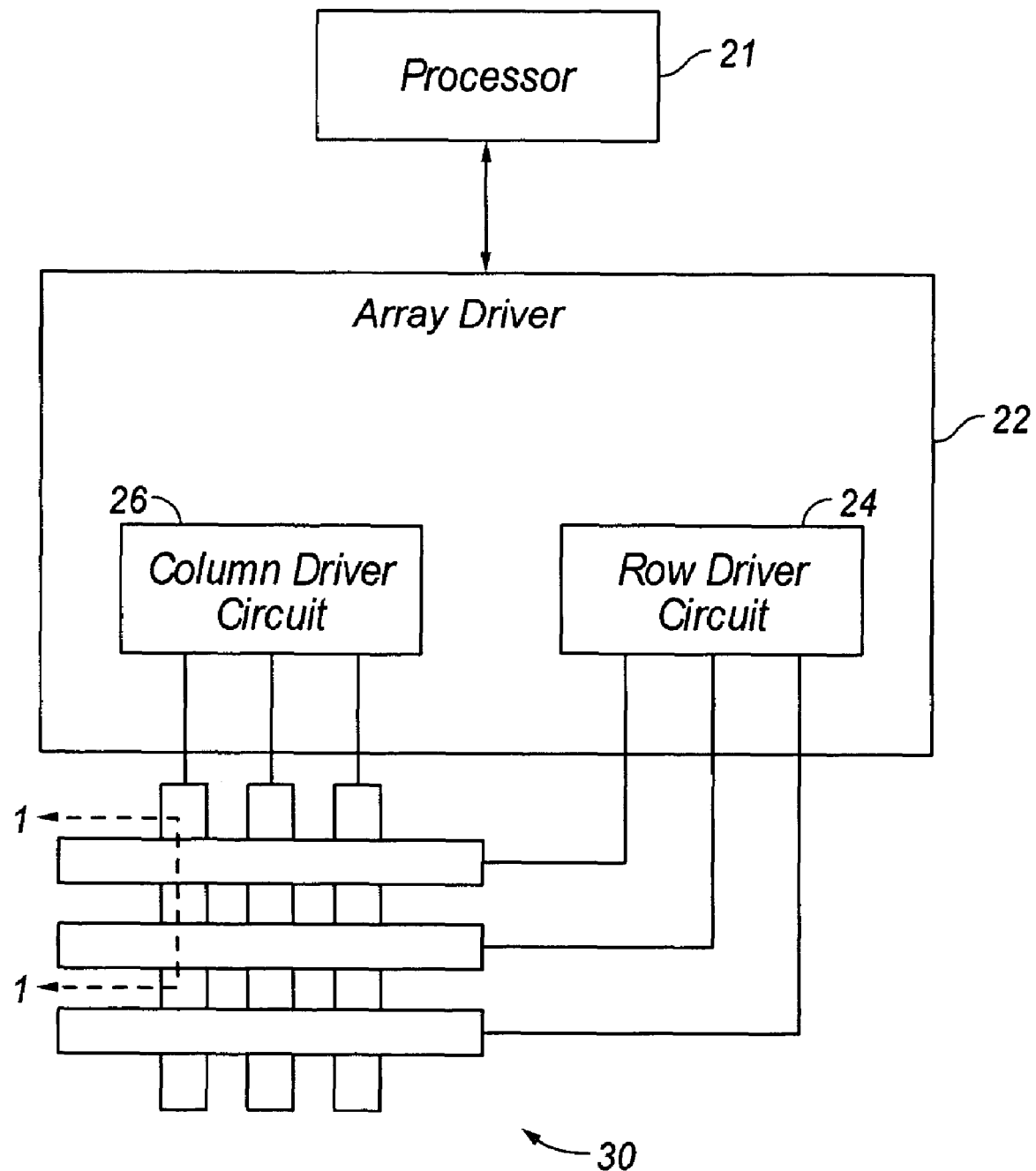
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
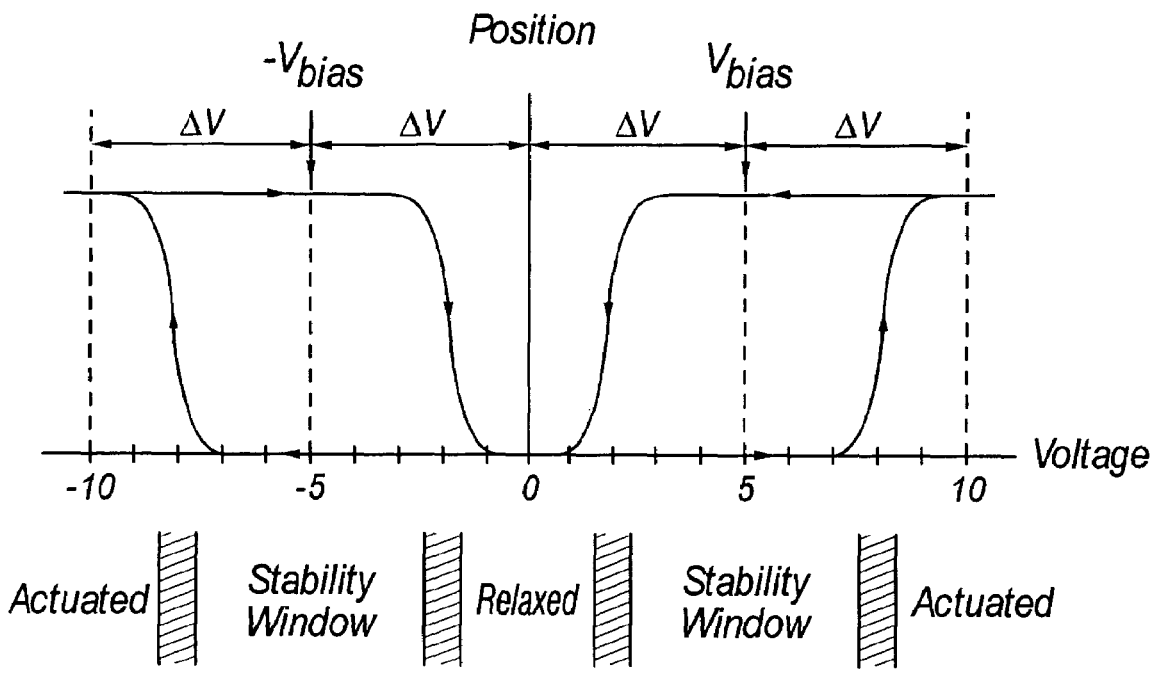
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

Figure 5A:
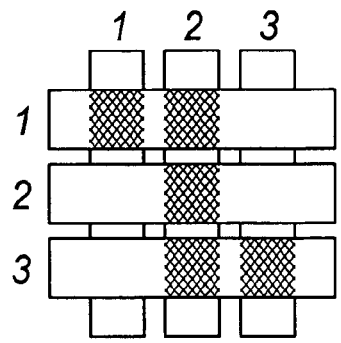
FIGS. 5A and 5B illustrate one exemplary timing diagram for row and column signals that may be used to write a frame of display data to the 3×3 interferometric modulator display of FIG. 2.
Figure 5B:
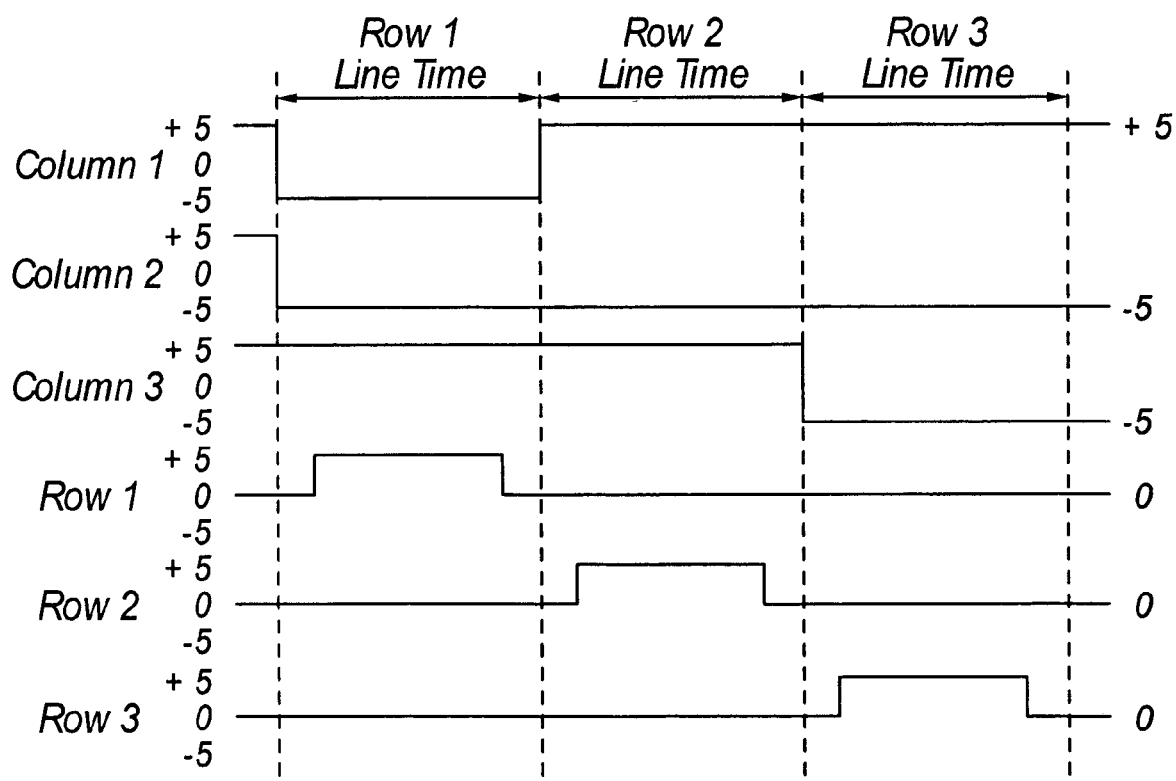

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
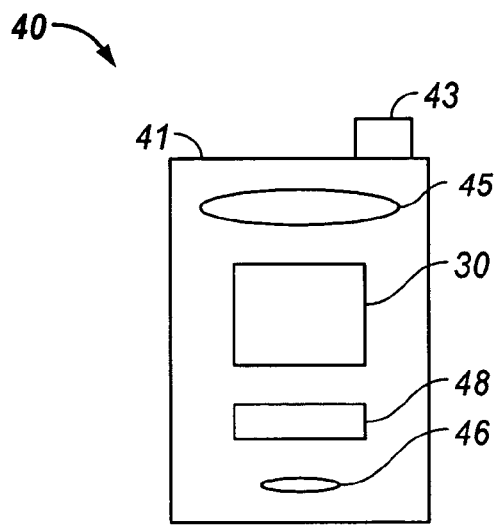
FIGS. 6A and 6B are system block diagrams illustrating an embodiment of a visual display device comprising a plurality of interferometric modulators.
Figure 6B:
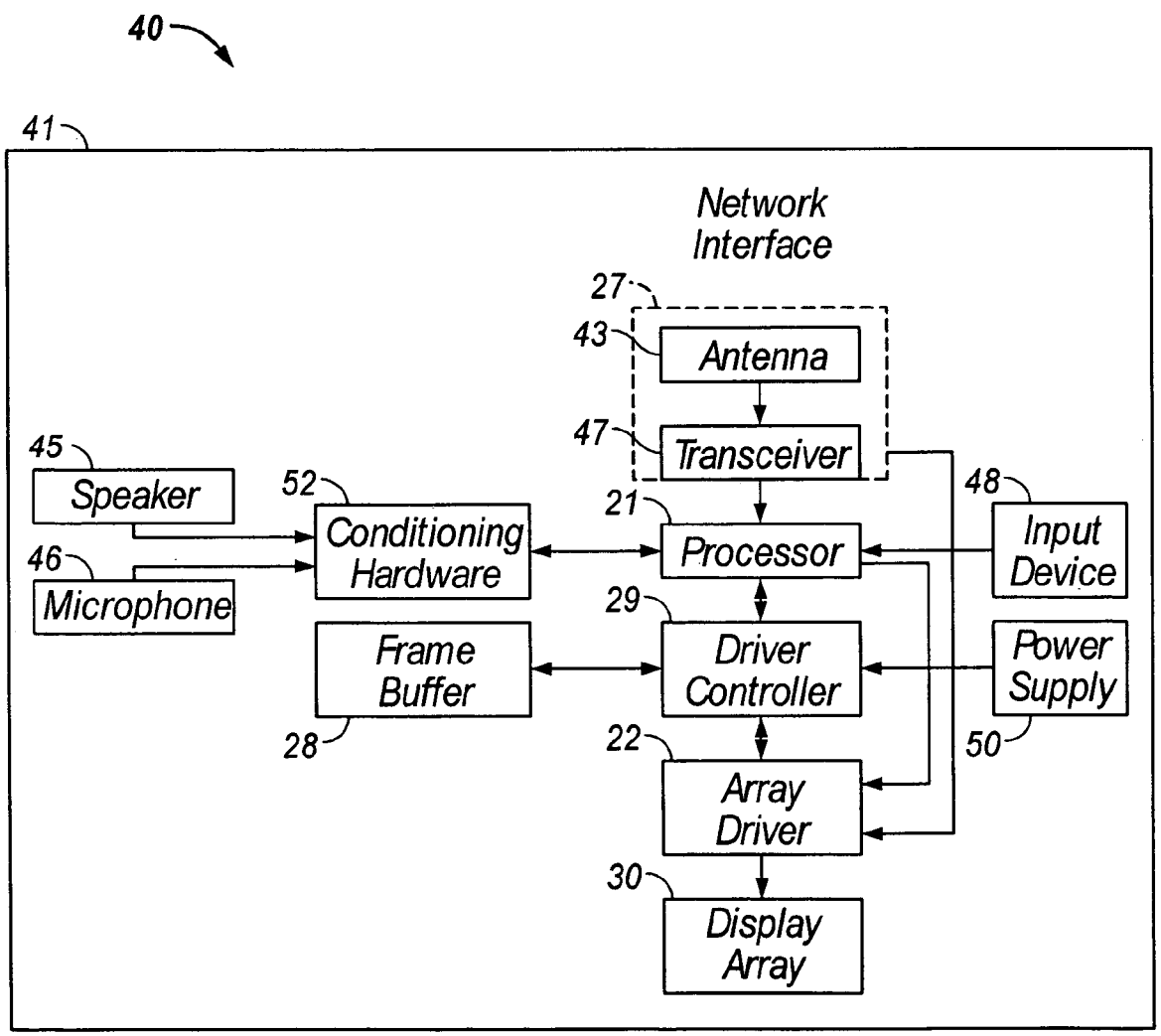

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 44, an input device 48, and a microphone 46. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one ore more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. Those of skill in the art will recognize that the above-described optimization may be implemented in any number of hardware and/or software components and in various configurations.

Figure 7A:
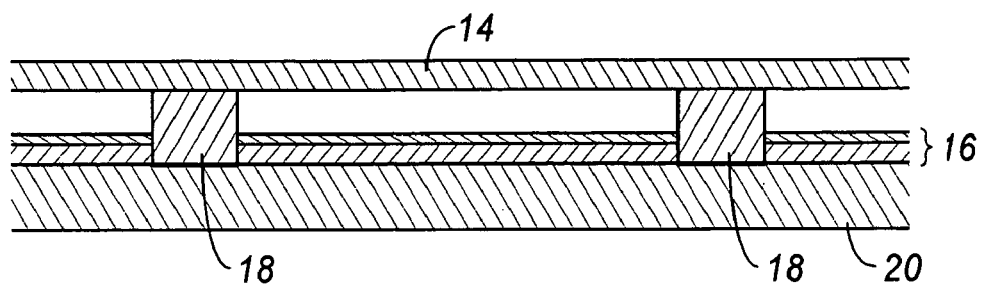
FIG. 7A is a cross section of the device of FIG. 1.
Figure 7B:
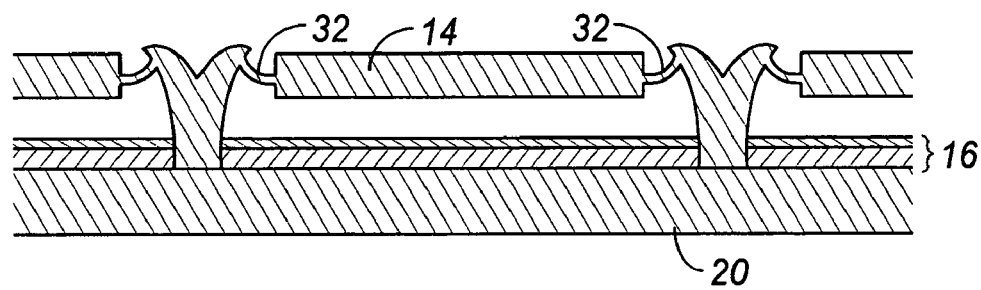
FIG. 7B is a cross section of an alternative embodiment of an interferometric modulator.
Figure 7C:
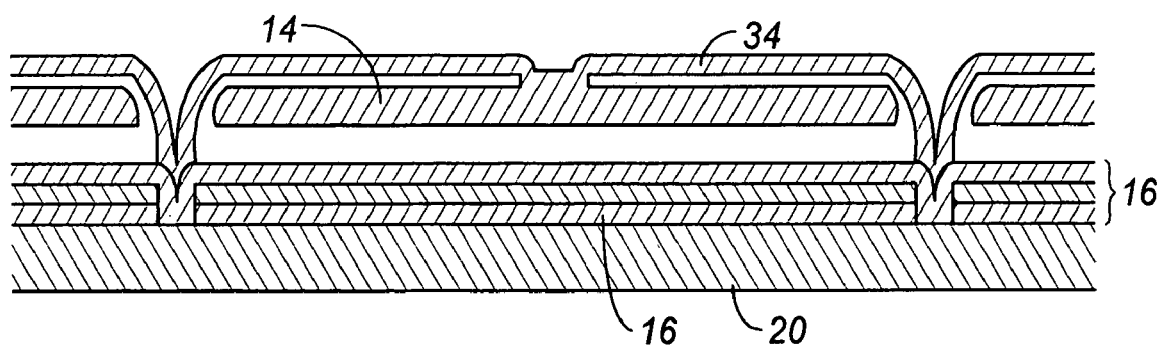
FIG. 7C is a cross section of another alternative embodiment of an interferometric modulator.
Figure 7D:
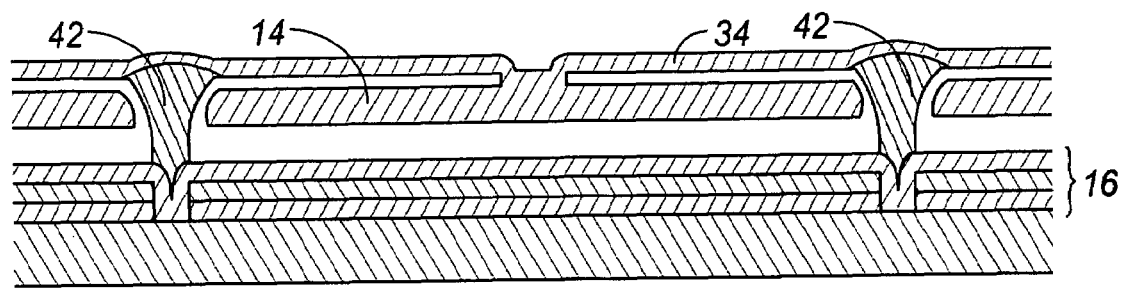
FIG. 7D is a cross section of yet another alternative embodiment of an interferometric modulator.
Figure 7E:
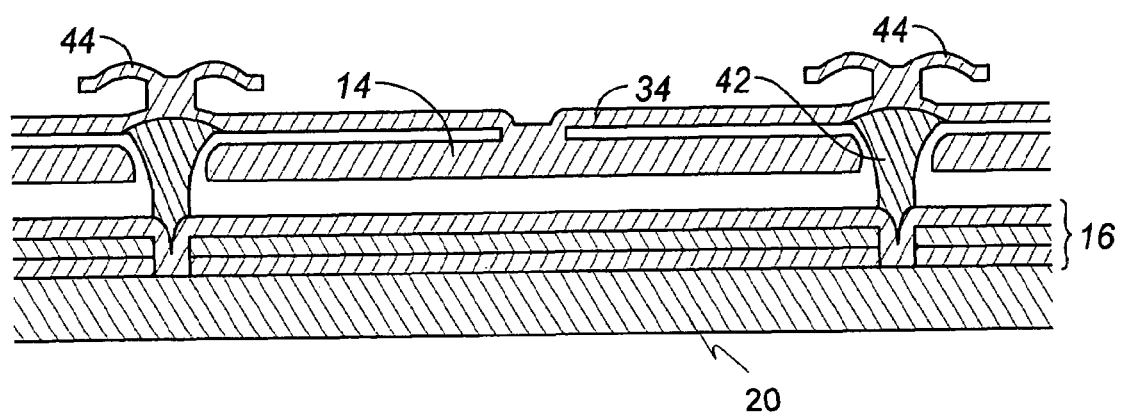
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the cavity, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34 and the bus structure 44. This allows the shielded areas to be configured and operated upon without negatively affecting the image quality. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

As discussed above with reference to FIG. 1, the modulator 12 (i.e., both modulators 12a and 12b) includes an optical cavity formed between the mirrors 14 (i.e., mirrors 14a and 14b) and 16 (mirrors 16a and 16b, respectively). The characteristic distance, or effective optical path length, d, of the optical cavity determines the resonant wavelengths, $\lambda$, of the optical cavity and thus of the interferometric modulator 12. A peak resonant visible wavelength, $\lambda$, of the interferometric modulator 12 generally corresponds to the perceived color of light reflected by the modulator 12. Mathematically, for resonance, the optical path length d is equal to ½ N $\lambda$, where N is an integer. A given resonant wavelength, $\lambda$, is thus reflected by interferometric modulators 12 having optical path lengths d of ½$\lambda$ (N=1), $\lambda$ (N=2), $\frac{3}{2}\lambda$ (N=3), etc. The integer N may be referred to as the order of interference of the reflected light. As used herein, the order of a modulator 12 also refers to the order N of light reflected by the modulator 12 when the mirror 14 is in at least one position. For example, a first order red interferometric modulator 12 may have an optical path length d of about 325 nm, corresponding to a wavelength $\lambda$ of about 650 nm. Accordingly, a second order red interferometric modulator 12 may have an optical path length d of about 650 nm.

In certain embodiments, the optical path length, d, is substantially equal to the distance between the reflective layers that form the optical cavity of the interferometric modulators. Where the space between the reflective layers comprises only a gas (e.g., air) having an index of refraction of approximately 1, the effective optical path length is substantially equal to the distance between the reflective layers. In certain embodiments, a layer of dielectric material in the optical path. Such dielectric materials typically have an index of refraction greater than one. In such embodiments, the optical cavity is formed to have the desired optical path length d by selecting both the distance between the reflective layers and the thickness and index of refraction of the dielectric layer, or of any other layers between the reflective layers. For example, in the embodiment in which the optical cavity includes a layer of a dielectric in addition to the air gap, the optical path length d is equal to $d_1 n_1 + d_2 n_2$, where $d_1$ is the thickness of dielectric layer, $n_1$ is the index of refraction of the dielectric layer and similarly $d_2$ is the thickness of air gap and $n_2$ is the index of refraction of the air gap.

Moreover, in one embodiment, in the actuated position, the movable reflective layer is sufficiently close to the fixed reflective layer, and the optical path length, d, accounting for any dielectric layers, is thus sufficiently small, that the effects of interference are negligible. The modulator 12 therefore acts as a mirror that reflects substantially all colors of incident visible light substantially equally, e.g., as white light. Without subscribing to any particular theory, the broadband mirror effect is caused because the small optical path length d is too small for optical resonance in the visible band. The reflective layer 14 in such an embodiment thus merely acts as a reflective surface with respect to visible light.

Generally, modulators 12 reflect light that has one or more spectral peaks when wavelength is plotted versus intensity. The perceived color of light produced by a modulator 12 depends on the number, location, and spectral width of these peaks of the modulator 12 within the visible spectrum. The width of such peaks may be characterized by the width of the peak at the half maximum of intensity of reflected light, e.g., the full width at half maximum. Generally, higher order modulators 12 reflect light over a narrower range of wavelengths, e.g., have a narrower peak or higher "Q" value, and thus produce colored light that is more saturated. The saturation of the modulators 12 that comprise a color pixel affects properties of a display such as the color gamut and white point of the display. For example, in order for a display using a second order modulator 12 to have the same white point or color balance as a display that includes a first order modulator reflecting the same general color of light, the second order modulator 12 may be selected to have a different central peak optical wavelength.

In designing a display using interferometric modulators 12, the modulators 12 may be formed so as to increase the color saturation of reflected light. Saturation refers to the narrowness of the range of wavelengths of light output. A highly saturated hue has a vivid, intense color, while a less saturated hue appears more muted and grey. For example, a laser, which produces a very narrow range of wavelengths, produces highly saturated light. Conversely, a typical incandescent light bulb produces white light that may have a desaturated red or blue color. In one embodiment, the modulator 12 is formed with an optical path length, d, corresponding to higher order of interference, e.g., 2nd or 3rd order, to increase the saturation of reflected color light.

In one embodiment of the display array 30, each pixel includes one or more color modulators 12, e.g., modulators configured to reflect red, green, and blue light, and one or more "white" modulators 12 configured to reflect white light. In such an embodiment, light from the red, green, and/or blue modulators 12 in their reflective states combines to output colored light. Light from the white modulators 12 can be used to output white or gray light. Use of white in combination with color may increase the brightness or intensity of the pixels.

The white point of a display is the hue that is considered to be generally neutral (gray or achromatic). The white point of a display device may be characterized based on a comparison of white light produced by the device with the spectral content of light emitted by a black body at a particular temperature ("black body radiation"). A black body radiator is an idealized object that absorbs all light incident upon the object and which reemits the light with a spectrum dependent on the temperature of the black body. For example, the black body spectrum at 6,500° K may be referred to as white light having a color temperature of 6,500° K Such color temperatures, or white points of approximately 5,000°-10,000° K are generally identified with daylight.

The International Commission on Illumination (CIE) promulgates standardized white points of light sources. For example, light source designations of "d" refer to daylight. In particular, standard white points $D_{55}$, $D_{65}$, and $D_{75}$, which correlate with color temperatures of 5,500° K, 6,500° K, and 7,500° K, are standard daylight white points.

A display device may be characterized by the white point of the white light produced by a display. As with light from other light sources, human perception of a display is at least partially determined by the perception of white light from the display. For example, a display or light source having a lower white point, e.g., D55, may be perceived as having a yellow tone by a viewer. A display having a higher temperature white point, e.g., D75 may be perceived as having a "cooler" or bluer tone to a user. Users generally respond more favorably to displays having higher temperature white points. Thus, controlling the white point of a display desirably provides some control over a viewer's response to a display. Embodiments of the interferometric modulator array 30 may be configured to produce white light in which the white point is selected to conform to a standardized white point under one or more anticipated lighting conditions.

White light can be produced by the pixel array 30 by including one or more interferometric modulators 12 for each pixel. For example, in one embodiment, the pixel array 30 includes pixels of groups of red, green, and blue interferometric modulators 12. As discussed above, the colors of the interferometric modulators 12 may be selected by selecting the optical path length d using the relation of $d=\frac{1}{2} N \lambda$. In addition, the balance, or relative proportions, of the colors produced by each pixel in the pixel array 30 may be further affected by the relative reflective areas of each of the interferometric modulators 12, e.g., of the red, green, and blue interferometric modulators 12. Further, because the modulators 12 selectively reflect incident light, the white point of reflected light from the pixel array 30 of interferometric modulators 12 is generally dependent on the spectral characteristics of incident light. In one embodiment, the white point of reflected light may be configured to be different than the white point of incident light. For example, in one embodiment, the pixel array 30 may be configured to reflect D75 light when used in D65 sunlight.

In one embodiment, the distances d and areas of the interferometric modulators 12 in the pixel array 30 are selected so that white light produced by the pixel array 30 corresponds to a particular standardized white point in an anticipated lighting condition, e.g., in sunlight, under fluorescent light, or from a front light positioned to illuminate the pixel array 30. For example, the white point of the pixel array 30 may be selected to be $D_{55}$, $D_{65}$, or $D_{75}$ in particular lighting conditions. Moreover, the light reflected by the pixel array 30 may have a different white point than the light of an anticipated or configured light source. For example, a particular pixel array 30 may be configured to reflect D75 light when viewed under D65 sunlight. More generally, the white point of a display may be selected with reference to a source of illumination configured with the display, e.g., a front light, or with reference to a particular viewing condition. For example, a display may be configured to have a selected white point, e.g., D55, D65, or D75, when viewed under anticipated or typical sources of illumination such as incandescent, fluorescent, or natural light sources. More particularly, a display for use in a handheld device, for example, may be configured to have a selected white point when viewed under sunlight conditions. Alternatively, a display for use in an office environment may be configured to have a selected white point, e.g., D75, when illuminated by typical office fluorescent lights. In various embodiments, different distances d and areas of modulators 12 may be selected to produce other standardized white point settings for different viewing environments. Further, the red, green, and blue modulators 12 may also be controlled so as to be in reflective or non-reflective states for different amounts of time so as to further vary the relative balance of reflected red, green, and blue light, and thus the white point of reflected light. In one embodiment, the ratio of reflective areas of each of the color modulators 12 may be selected so as to control the white point in different viewing environments. In one embodiment, the optical path length d may be selected so as to correspond to a common multiple of more than one visible resonant wavelength, e.g., first, second, or third order peaks of red, green, and blue, so that the interferometric modulator 12 reflects white light characterized by three visible peaks in its spectral response. In such an embodiment, the optical path length d may be selected so that the white light produced corresponds to a standardized white point.

An exemplary color display includes red, green, and blue display elements. Other colors are produced in such a display by varying the relative intensity of light produced by the red, green, and blue elements. Such mixtures of primary colors such as red, green, and blue are perceived by the human eye as other colors. The relative values of red, green, and blue in such a color system may be referred to as tristimulus values in reference to the stimulation of red, green, and blue light sensitive portions of the human eye. The range of colors that can be produced by a particular display may be referred to as the color gamut of the display. In general, increasing the saturation of the primary colors increases the color gamut, or range of colors that can be produced by the display. While an exemplary color system based on red, green, and blue are disclosed herein, in other embodiments, the display may include modulators 12 having sets of colors that define other color systems in terms of sets of primary colors other than red, green, and blue.

In certain embodiments, a trade off exists between producing light that appears bright and producing saturated colors (and increasing the color gamut of the display) Generally, given the same relative intensity levels, an output spectral peak of a light modulator that is broad or wide will appear brighter than one that is narrow. However, while the broader spectrum will appear brighter, it will also appear pastel in color, i.e., less saturated.

In one embodiment, the saturation of light output by a display that includes the interferometric modulator 12 is increased using a color filter. In particular, such a display may include a color filter that is configured to output light having a wavelength response peak that is narrower than the visible light wavelength response peak of the modulator 12. Embodiments may also reduce viewing angle dependent color shift of the display because a source of the light is at a predetermined and consistent position and distance relative to the reflectors 14 and 16 of the modulator 12. Thus, if there is any color shift due to the position of the light source relative to the modulators 12, the interferometric modulator 12 can be tuned to reduce or eliminate this color shift.

Figure 8:
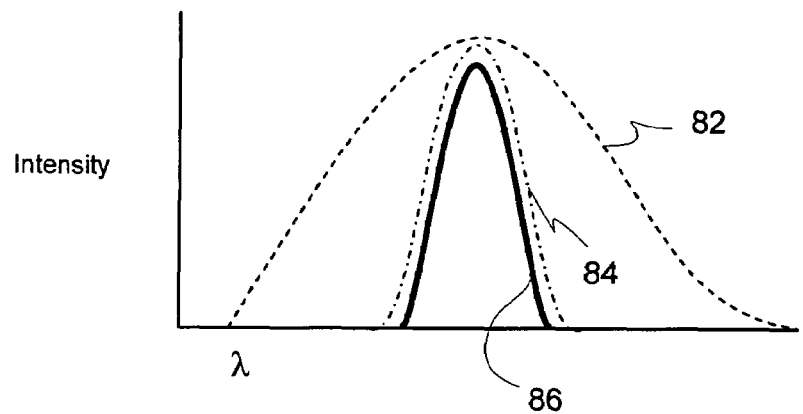
FIG. 8 is a graphical diagram that illustrates the spectral response of an exemplary display that includes the interferometric modulator viewed through a wavelength filter.

FIG. 8 is a graphical diagram that illustrates the spectral response of an exemplary display that includes the interferometric modulator 12 viewed through a wavelength filter. The vertical axis represents the total fraction of optical intensity of light incident on the interferometric modulator that is reflected by the interferometric modulator or transmitted by the wavelength filter when illuminated by white light. A trace 82 illustrates the spectral response of the interferometric modulator 12 when viewed without the wavelength filter. A trace 84 illustrates the spectral response of the wavelength filter in isolation. A trace 86 illustrates the spectral response of reflected light of an embodiment of a display that includes the wavelength filter and the interferometric modulator 12. The trace 82 includes a single peak in the visible spectrum. The trace 84 includes a single peak in the visible spectrum that is narrower in width, and somewhat centered within the peak defined by the trace 82. When viewed through the wavelength filter, the peak spectral response of the interferometric modulator 12 is substantially narrowed. In particular, as illustrated by the trace 86, the peak response of the combined optical system of the wavelength filter and the interferometric modulator is reduced to be similar in width to the width of the peak of the wavelength filter, which is substantially smaller than the width of the peak spectral response of the modulator 12 in isolation. The narrower peaked response of the display provides more saturated colors and an improved color gamut. The color gamut of the display may thus be adjusted without modifying the spectral response of the interferometric modulators 12.

Figure 9:
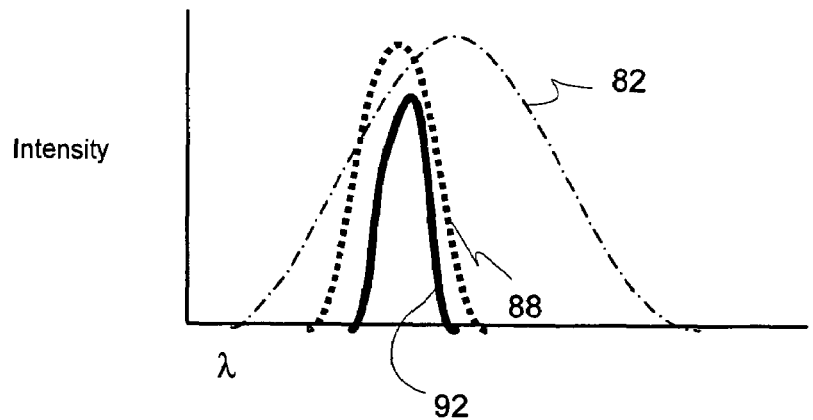
FIG. 9 is a graphical diagram that illustrates the spectral response of another exemplary display that includes the interferometric modulator 12 viewed through a wavelength filter.

FIG. 9 is a graphical diagram that illustrates the spectral response of another exemplary display that includes the interferometric modulator 12 viewed through a wavelength filter. The vertical axis represents the total fraction of optical intensity of light incident on the interferometric modulator that is reflected by the interferometric modulator or transmitted by the wavelength filter. A trace 82 illustrates the spectral response of the interferometric modulator 12 when viewed without the wavelength filter. A trace 88 illustrates the spectral response of the wavelength filter in isolation. A trace 92 illustrates the spectral response of reflected light of an embodiment of a display that includes the wavelength filter and the interferometric modulator 12. The trace 82 includes a single peak in the visible spectrum. The trace 88 includes a single peak in the visible spectrum that is narrower in width, and which does not completely overlaps the peak defined by the trace 82, rather than being within the peak defined by the trace 82 as in FIG. 8. When viewed through the wavelength filter, the peak spectral response of the interferometric modulator 12 is even more narrowed than the peak system response illustrated by the trace 86 of FIG. 8. In particular, as illustrated by the trace 92, the peak response of the combined optical system of the wavelength filter and the interferometric modulator is narrower than even the peak of the wavelength filter. Using the wavelength filter with a spectral peak that does not completely overlap the peak spectral response of the interferometric modulator, thus provides even more saturated colors than using a filter with the spectral properties illustrated in FIG. 8. Moreover, the spectral response of the combined optical system formed by the wavelength filter and the interferometric modulator 12 has a central peak spectral response that is shifted to be between the separate peak responses of the filter and interferometric modulator 12. Such a filter may thus be employed to adjust both the saturation and the hue of the display by both narrowing and shifting the spectral profile of the spectral response of the system illustrated by the trace 92 relative to the spectral response of the modulator 12 as illustrated by the trace 82.

Figure 10:
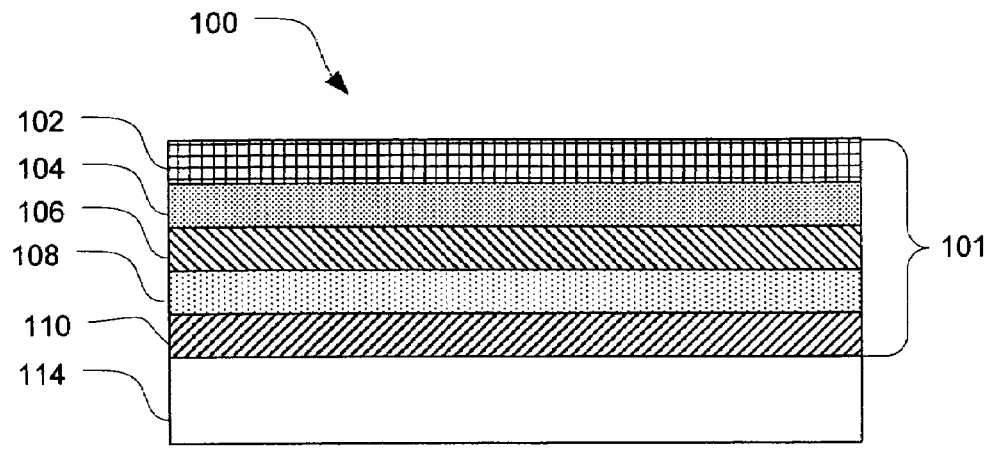
FIG. 10 a side cross-sectional view of an exemplary wavelength filter.

FIG. 10 is a side cross-sectional view of an exemplary wavelength filter 100 having a spectral response such as illustrated by traces like the traces 84 and 88 in FIG. 8 or 9, respectively. The filter 100 comprises a thin film structure 101 that serves as an interference-based wavelength (color) filter. The thin film structure 101 comprises a first partially reflective layer 102, a first dielectric layer 104, a second partially reflective layer 106, a second dielectric layer 108, a third partially reflective layer 110 and a substrate 114. The partially reflective layers 102, 106, 110 may comprise metal and thus be optical absorbing layers.

In one embodiment, the thin film structure 101 is applied as continuous coatings to the substrate 114. That is because, in this embodiment, there is no movable mirror within the thin film structure 101. The substrate 114 may include a layer of $SiO_2$, glass, plastic or any other suitable material that permits light to pass therethrough.

The partially reflective layers 102 may comprise the same material or different materials. In some embodiments, one or more of the partially reflective layers 102, 106, 110 comprise a metal. For example, and without limitation, the partially reflective layers may comprise a metal selected from the group consisting of chromium, titanium, molybdenum, gold and indium tin oxide (ITO). In one embodiment, the partially reflective layers comprise chromium. In other embodiments, the partially reflective layer comprises a material other than metal, such as silicon nitride.

The first dielectric 104 and second dielectric 108 may also be the same material or different materials. In some embodiments, at least one of the first and second dielectric 104, 108 are transparent oxides. In one embodiment, at least one of the first and second oxides 104, 108 comprises $SiO_2$.

The optical density of the filter can be varied by varying the thickness of the partially reflective layer 106, which as described above, may comprise metal. In certain embodiments, the partial reflector comprises aluminum. However, other suitable materials with reflective properties may also be utilized. In some embodiments, the partially reflective layers 102, 106, 110 may comprise nanolaminate structures.

In one embodiment, the first and third partially reflective layers 102, 110 and the two oxide layers 104, 108 are the same thickness, such that reflected light would be similar in both halves of the structure. However, in other embodiments, the structure 101 is asymmetric to influence the relationship between reflected color and transmitted color.

Because the films utilized in the wavelength filter structures can be sputtered at low temperatures, the layers can be used on plastic substrates as well as glass substrates. Depending on the particular application in which the filters are utilized, the filters may be coated with a transparent polymer coating in order to prevent scratches.

The thickness and composition of the thin films in the wavelength filters described above can be adjusted to modulate the properties of the filters. For example, the thickness and index of refraction of the dielectric layers can be adjusted such that the thin film stack is a color filter. In one embodiment, the thickness and composition of the dielectric layers are selected such that the layers form a magenta filter. In another embodiment, the thickness and composition of the dielectric layers are selected such that the structure serves as a red, green or blue band pass filter. In some embodiments, the appropriate materials and thicknesses of the dielectric layers may be selected to produce a filter with the desired properties in a manner similar to discussed above for configuring the interferometric modulator 12, Other techniques, such as for example, known techniques disclosed in the "American Institute Physics Handbook," 6-172 (3rd. ed. 1972) may also be used. In addition, designs may also be obtained in other ways.

Wavelength filters based on interferometric modulator structures as described above may be used in a wide range of applications for which wavelength or color filters are typically utilized. For example and without limitation, optical devices such as microscopes, binoculars, telescopes, and sunglasses may include such filters. In a particular embodiment, the wavelength filter 101 is utilized as a coating on the lenses in sunglasses. Depending on the design of the thin film structure, the color of the glasses could be either a broadband reflector or an iridescent reflector. In addition, because the thin film structure is an interference based filter, the observed color of an object would shift with viewing angle.

By adjusting the composition of the layers of the thin film structure and the thickness of the individual layers, the reflected color on each side of the lens can be selected. Thus, in the case of sunglasses, the color seen by the wearer and the color seen by viewers of the outside of the sunglasses can be adjusted to create a desired effect. In a particular embodiment, the thin film structure 101 illustrated in FIG. 10 is utilized as a coating on sunglass lenses. In one embodiment, the thickness and composition of the dielectric layer 104 is adjusted such that the sunglass lenses appear colored to the external viewer.

Figure 11:
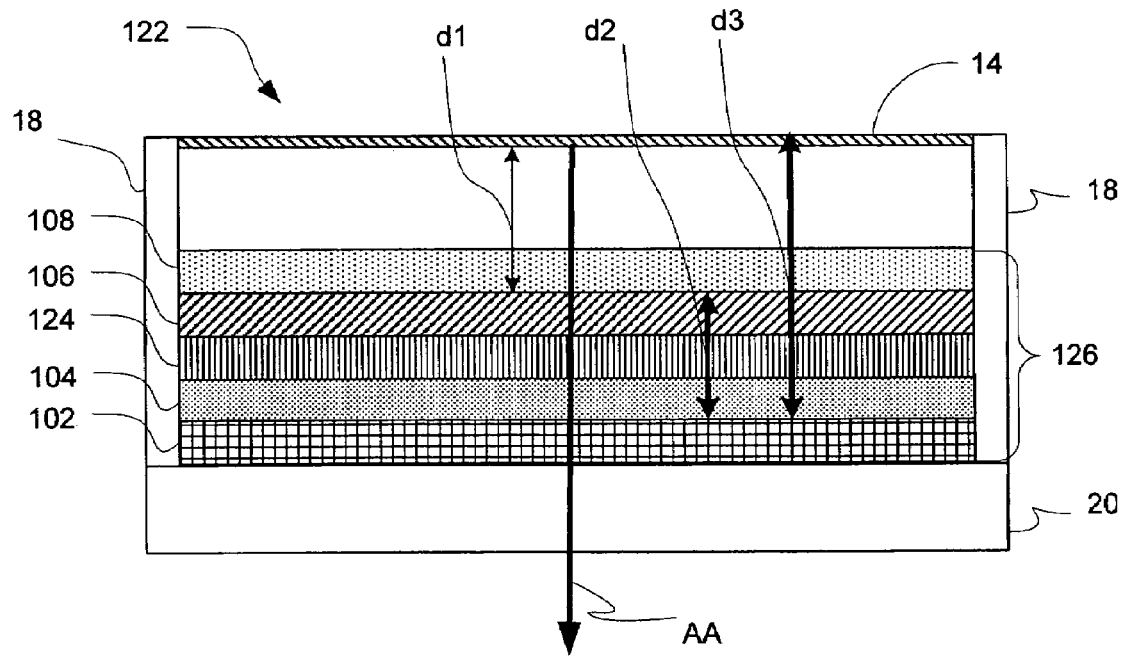
FIG. 11 a side cross-sectional view of an exemplary display that includes interferometric modulator comprising a wavelength filter.

FIG. 11 is a side cross-sectional view of an exemplary interferometric modulator 122 that includes a wavelength filter. In one embodiment, the modulator 122 includes the thin film wavelength filter as part of an optical stack 126 formed on the substrate 20. The optical stack 126 includes a partially reflective layer 102, a transparent dielectric layer 104, a transparent electrode 124, a partially reflective layer 106, and a dielectric layer 108. The optical stack 126 is positioned with respect to the reflective layer 14 so as to define a cavity region in which the reflective layer 14 may move upon deflection. In one embodiment, the reflective layer 14 is connected to the substrate 20 by the posts 18. Generally, the modulator 122 may include features according to any embodiment of the modulator 12 disclosed herein.

The dielectric layer 104 and partially reflective layers 102 and 106 together define an optical cavity that form an interferometric wavelength filter. As discussed above, the thickness and composition (index of refraction) of the dielectric layer 104 can be adjusted to vary the effective optical path length of the optical cavity formed between layers 102 and 106 to produce the desired color filter. For example, the dielectric material may be selected such that a magenta filter is produced. If the interferometric device is set up to produce green light (in the absence of a wavelength filter), the magenta filter will adjust the wavelength of output light such that it appears white to the viewer. In other embodiments, the dielectric layer is adjusted to form a red, green or blue band pass filters as desired. Such filters only allow the desired wavelength of light to pass into and out of the device. As noted with reference to FIGS. 8 and 9, such wavelength filters may employed to increase the saturation of colored light produced by the modulator 12 and thereby increase the color gamut of a display including the modulator 12 comprising the optical stack 126.

For example, one embodiment includes modulators 122 in which the optical path length, d, is selected to produce a first order green spectral response. The optical stack 126 in such modulators 122 is configured to increase the saturation of the green. For example, the reflective layer 102 may comprise a thin (30 angstroms rather than 50-80 angstroms) chrome layer. In another similar embodiment, the optical stack 126 may be configured to output magenta light when illuminated with white light so that the modulator 122 so construction reflects white light.

The production of an interferometric modulator device incorporating a wavelength filter in the optical stack 126 requires only a few additional process steps compared to the production of an interferometric modulator device without the filter. In the example illustrated in FIG. 11, incorporation of the wavelength filter requires only the additional steps of depositing the dielectric layer 104 and the partially reflective layer 102. The additional processing requirements can be further reduced or minimized if the dielectric layer 104 comprises the same material as the dielectric layer 108 and/or if the partially reflective layer 102 is made of the same material as the partially reflective layer 106.

Without subscribing to any particular theory of operation, the reflective layer 14 and the reflective layer 106 defines a first optical cavity characterized by the optical path, $d_1$, therebetween. The optical stack 126 defines a second optical cavity characterized by an optical path length $d_2$ between the partially reflective layers 106 and 102. In addition, the reflective layer 14 and the partially reflectively 102 define a third cavity having the optical path length $d_3$ therebetween. Thus, in some embodiments, the output of the modulator 12 may be further adjusted by selection of the layers of the optical stack 126 and the optical path lengths $d_3$ so as to select visible light properties of this third cavity. In other embodiments, these parameters may be selected so that the third cavity does not provide any significant contribution to visible light spectral response of the modulator 12.

Generally, the color of light reflected by the interferometric modulator 122 shifts when the modulator 122 is viewed from different angles. The color of light reflected from the interferometric modulator 122 may vary for different angles of incidence (and reflection) with respect to an axis AA as illustrated in FIG. 11. With increasing view angle, the effective optical path of the interferometric modulator is decreased according to the relationship $2d \cos \beta = N\lambda$, where $\beta$ is the view angle (the angle between the normal to the display and the incident light). With increasing view angle, the peak resonant wavelength of the reflected light is decreased. The user therefore perceives different colors depending on his or her angle of view. As described above, this phenomenon is referred to as a "color shift." This color shift is typically identified with reference to a color produced by an interferometric modulator 12 when viewed along the axis AA. In one embodiment, the optical stack 126 is configured to selectively filter light that "shifted" outside of the desired range of colors for a particular modulator. Thus, rather than appearing to change color as view angle increases, such an interferometric modulator 122 tends to output light of a reduced intensity at increasing angles as the modulators output is shifted outside of the range of wavelengths transmitted by the wavelength filter. In one embodiment, an absorptive filter may be included in the optical stack 126 to filter such light. In another embodiment, an interference filter in the optical stack 126 may be configured to filter such color shifted light. The interference filter may also be subject to such color shift. However, because the dielectric layer 104 has, in one embodiment, an index of refraction that is larger than that of air in the gap 18 (as shown in FIG. 11), the color shift is still reduced as compared to the modulator 122. In particular, as light enters the higher index dielectric layer, it is directed to a more normal angle to the reflective layers thus affecting the optical path within the interference filter and thereby reducing color shift. For example, if the modulator 122 reflects green light and the interference filter portion of the optical stack transmits green light, the range of green transmitted wavelengths shifts less than the shift in range of green reflected wavelengths from the modulator. The intensity of shifted light is thereby reduced in aggregate. The overall brightness of such a device is also reduced, reducing the eye's perception of any change in the hue of output light.

The interferometric modulator 122 can be used in many different embodiments of a display. For example, one embodiment includes the display array 30 comprising interferometric modulators 122 in which the optical path length, $d_2$, of the stack 126 is selected to adjust the color balance, or white point of the display array 30. In one embodiment, the reflective layers 14 and 106 and the dielectric layer 108 are configured so that in the actuated position, the reflective layer 14 comprises a broadband (or white) reflector). In such an embodiment, the layers of the optical stack 126 are configured as a color filter so that the modulator 122 outputs colored light. In one such embodiment, the display 30 is a color display that includes a plurality of modulators 122 in which the movable reflective layer 14 is configured to be a broadband reflector. Such an embodiment of the color display 30 produces color by configuring the optical stack 126 in different portions of the display (e.g., different columns) to produce, for example, red, green, and blue light from the modulators 122. Such color displays 30 allow the movable reflector (MEMS) portion of the display for each color to be formed to be substantially identical with only the optical stack portion of the color modulators being varied. Alternatively, a similar embodiment includes modulators 122 in which the optical path length, $d_1$, is selected to produce multiple peaks in the visible spectrum corresponding to primary colors such as red, green, and blue. The optical stack 126 of such modulators may be configured so that portions of the modulators 122 in a particular display 30 output each of the primary colors, e.g., columns of alternating red, green, and blue modulators so as to produce a color display. Other configurations are possible. For example, the thickness of dielectric 104 may be varied to produce different colors. Thus, in one embodiment, different portions of a display configured to display different colors may not have a uniform structure. Thus in one embodiment that includes red, green, and blue pixels forming a color display, the light modulators for each of the colors may be arranged in rows or columns that each have a different stack structure.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. For example, additional layers may be added, layers may be removed or ordered differently. Different geometries and materials may be used. Other variations are possible as well. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A device for modulating light, the device comprising:
a movable reflector;
a first partial reflector positioned at a first distance from said movable reflector;
at least one layer of dielectric material between said first partial reflector and said movable reflector; and
a second partial reflector positioned at a second fixed distance from said first partial reflector,
wherein said movable reflector is movable with respect to said first partial reflector to alter said first distance and wherein said first and second partial reflectors comprise an interferometric filter configured to increase the saturation of light reflected by said movable reflector and said first partial reflector.

2. The device of claim 1, further comprising an electrode between said first and second partial reflectors.

3. The device of claim 2, further comprising a layer of dielectric material between said electrode and said second partial reflector.

4. The device of claim 1, wherein said first partial reflector is positioned between said movable reflector and said second partial reflector.

5. The device of claim 1, further comprising a substrate, wherein said second partial reflector is between said first partial reflector and said substrate.

6. The device of claim 1, wherein said first and second partial reflectors define an optical cavity that is configured to selectively transmit visible wavelengths associated with a color of light and substantially filter other visible wavelengths when illuminated with white light.

7. The device of claim 1, further comprising at least one layer of dielectric material between said first partial reflector and said second partial reflector.

8. The device of claim 1, wherein said movable reflector and said first partial reflector reflect white light when the movable reflector is in at least one position.

9. The device of claim 1, wherein said device forms part of a display.

10. The device of claim 9, further comprising:
a processor that is in electrical communication with said display, said processor being configured to process image data; and
a memory device in electrical communication with said processor.

11. The device of claim 10, further comprising:
a driver circuit configured to send at least one signal to said display.

12. The device of claim 11, further comprising:
a controller configured to send at least a portion of said image data to said driver circuit.

13. The device of claim 12, further comprising:
an image source module configured to send said image data to said processor.

14. The device of claim 13, wherein said image source module comprises at least one of a receiver, transceiver, and transmitter.

15. The device of claim 10, further comprising:
an input device configured to receive input data and to communicate said input data to said processor.

16. The device of claim 1, wherein said movable reflector and said second partial reflector define an optical cavity configured to contribute insubstantially to the visible light spectral response of said movable reflector and said first partial reflector.

17. The device of claim 1, wherein the interferometric filter comprises a color filter.

18. The device of claim 1, wherein the interferometric filter is configured to provide a band pass response characterized by a particular color, whereby the interferometric filter selectively transmits visible wavelengths associated with said particular color and substantially filters other visible wavelengths.

19. The device of claim 1 provided with electronics configured to drive the movable reflector such that light reflected by said movable reflector and said first partial reflector can be modulated so as to form part of an image viewable on a display.

20. The device of claim 19, wherein the display comprises a reflective display.

21. The device of claim 1, wherein the display is configured to form an image by selectively modulating ambient light.

22. The device of claim 1, wherein the movable reflector comprises a metal.

23. The device of claim 1, wherein at least one of the first and second partial reflectors comprises a metal.

24. The device of claim 1, wherein said device comprises a display element included in an array of display elements of a display such that light reflected by said movable reflector and said first partial reflector forms part of an image produced by said array of display elements and said interferometric filter increases the color gamut of said display.

25. A display comprising a plurality of display elements, each of the display elements comprising:
means for reflecting light, said reflecting means being movable;
first means for partially reflecting light, wherein said movable reflecting means and said first partially reflecting means are configured to interferometrically modulate light;
at least one layer of dielectric material between said first partially reflecting means and said movable reflecting means; and
second means for partially reflecting light, wherein said first partially reflecting means and said second partially reflecting means are configured to interferometrically filter light, and wherein said first and second partially reflecting means comprise an interferometric filter configured to increase the saturation of light reflected by said movable reflecting means and said first partially reflecting means.

26. The display of claim 25, further comprising:
means for actuating said means for reflecting light.

27. The display of claim 26, wherein said means for actuating comprises an electrode.

28. The display of claim 25, wherein said reflecting means comprises a reflective layer.

29. The display of claim 25, wherein said first partially reflecting means comprises a partially reflective layer.

30. The display of claim 25, wherein said second partially reflecting means comprises a partially reflective layer.

31. The display of claim 25, wherein said interferometric filter comprises a color filter.

32. The display of claim 25 provided with means for controlling, wherein said controlling means are configured to drive said movable reflecting light means such that light reflected by said movable reflecting light means and said first partially reflecting light means can be modulated so as to form part of an image viewable on the display.

33. The display of claim 32, wherein the display comprises a reflective display.

34. The display of claim 25, wherein light reflected by said movable reflecting light means and said first partially reflecting light means forms part of an image produced by said plurality of display elements and said interferometric filter increases the color gamut of said display.

35. A device for modulating light, the device comprising:
a movable reflector;
a first partial reflector positioned at a first distance from said movable reflector, the movable reflector being movable with respect to said partial reflector to alter said first distance;
at least one layer of dielectric material between said first partial reflector and said movable reflector;
a second partial reflector positioned at a second fixed distance from said first partial reflector; and
an electrode positioned between said first and second partial reflectors and configured to alter the position of said movable mirror,
wherein said first and second partial reflectors comprise an interferometric filter configured to increase the saturation of light reflected by said movable reflector and said first partial reflector.

36. The device of claim 35, further comprising a layer of dielectric material between said electrode and said second partial reflector.

37. The device of claim 35, further comprising a substrate, wherein said second partial reflector is between said first reflector and said substrate.

38. The device of claim 35, further comprising at least one layer of dielectric material between said first partial reflector and said second partial reflector.

39. The device of claim 35, wherein the interferometric filter comprises a color filter.

40. The device of claim 35 provided with electronics configured to drive the movable reflector such that light reflected by said movable reflector and said first partial reflector can be modulated so as to form part of an image viewable on a display.

41. The device of claim 35, wherein the display comprises a reflective display.

42. The device of claim 35, wherein said device comprises a display element included in an array of display elements of a display such that light reflected by said movable reflector and said first partial reflector forms part of an image produced by said array of display elements and said interferometric filter increases the color gamut of said display.

43. A method of making a device for modulating light, the method comprising:
    forming a movable reflector;
    forming a first partial reflector positioned at a first distance from said movable reflector;
    forming at least one layer of dielectric material between said first partial reflector and said movable reflector; and
    forming a second partial reflector positioned at a second fixed distance from said first partial reflector,
    wherein said movable reflector is movable with respect to said first partial reflector to alter said first distance and wherein said first and second partial reflectors comprise an interferometric filter configured to increase the saturation of light reflected by said movable reflector and said first partial reflector.

44. The method of claim 43, further comprising forming an electrode between said first and second partial reflectors.

45. The method of claim 44, further comprising forming a layer of dielectric material between said electrode and said second partial reflector.

46. The method of claim 43, further comprising performing said steps of forming onto a substrate, wherein said second partial reflector is between said first reflector and said substrate.

47. The method of claim 43, wherein said first and second partial reflectors are formed to define an optical cavity that is configured to selectively transmit visible wavelengths associated with a color of light and substantially filter other visible wavelengths when illuminated with white light.

48. The method of claim 43, further comprising forming at least one layer of dielectric material between said first partial reflector and said second partial reflector.

49. The method of claim 43, wherein said movable reflector and said first partial reflector are formed so as to reflect white light when the movable reflector is in at least one position.

50. The device formed by the method of claim 43.

51. The method of claim 43, wherein said movable reflector and said second partial reflector define an optical cavity configured to contribute insubstantially to the visible light spectral response of said movable reflector and said first partial reflector.

52. The method of claim 43, wherein the interferometric filter comprises a color filter.

53. The method of claim 43 further comprising providing electronics configured to drive the movable reflector such that light reflected by said movable reflector and said first partial reflector can be modulated so as to form part of an image viewable on a display.

54. The method of claim 53, wherein the display comprises a reflective display.

55. The method of claim 43, wherein said device comprises a display element included in an array of display elements of a display such that light reflected by said movable reflector and said first partial reflector forms part of an image produced by said array of display elements and said interferometric filter increases the color gamut of said display.

* * * * *

UNITED STATES PATENT AND TRADEMARK OFFICE
CERTIFICATE OF CORRECTION

PATENT NO. : 7,898,521 B2  
APPLICATION NO. : 11/213659  
DATED : March 1, 2011  
INVENTOR(S) : Brian J. Gally et al.

Page 1 of 1

It is certified that error appears in the above-identified patent and that said Letters Patent is hereby corrected as shown below:

Title page 4, column 1, line 44, under OTHER PUBLICATIONS, change "11/083,84,"
to --11/083,841,--.

Title page 4, column 2, line 24, under OTHER PUBLICATIONS, change "2007/1270460"
to --2007/127046)--.

In column 21, line 8, claim 41, change "35," to --40,--.

Signed and Sealed this
Eighteenth Day of October, 2011

David J. Kappos
*Director of the United States Patent and Trademark Office*